United States Patent
Kovie et al.

(10) Patent No.: US 12,006,753 B2
(45) Date of Patent: Jun. 11, 2024

(54) REAR DOOR ASSEMBLY

(71) Applicant: NISSAN NORTH AMERICA, INC., Franklin, TN (US)

(72) Inventors: David Kovie, Livonia, MI (US); Christopher Herrala, Milford, MI (US)

(73) Assignee: Nissan North America, Inc., Franklin, TN (US)

(*) Notice: Subject to any disclaimer, the term of this patent is extended or adjusted under 35 U.S.C. 154(b) by 0 days.

(21) Appl. No.: 17/589,851

(22) Filed: Jan. 31, 2022

(65) Prior Publication Data
US 2023/0243202 A1  Aug. 3, 2023

(51) Int. Cl.
*E05F 15/63*  (2015.01)
*B60J 5/10*  (2006.01)

(52) U.S. Cl.
CPC ............. *E05F 15/63* (2015.01); *B60J 5/106* (2013.01); *E05Y 2201/434* (2013.01); *E05Y 2201/626* (2013.01); *E05Y 2201/652* (2013.01); *E05Y 2201/71* (2013.01); *E05Y 2900/546* (2013.01)

(58) Field of Classification Search
CPC .......... E05F 15/63; E05F 15/627; B60J 5/106
See application file for complete search history.

(56) References Cited

U.S. PATENT DOCUMENTS

| | | | |
|---|---|---|---|
| 1,490,065 A * | 4/1924 | Ainsworth | E05F 15/627 49/118 |
| 4,620,743 A | 11/1986 | Eke | |
| 5,921,611 A | 7/1999 | Townsend | |
| 6,234,563 B1 | 5/2001 | Bascou | |
| 6,386,613 B1 | 5/2002 | Vader | |
| 7,188,863 B2 | 3/2007 | Tiesler et al. | |
| 7,429,070 B2 * | 9/2008 | Neubrand | B60J 7/141 296/100.09 |
| 7,828,366 B2 | 11/2010 | Andre et al. | |
| 8,020,912 B2 | 9/2011 | Lounds | |
| 8,376,449 B2 | 2/2013 | Kitayama et al. | |

(Continued)

FOREIGN PATENT DOCUMENTS

CA    3 056 734   * 10/2018
CN    1590196 A    3/2005

(Continued)

*Primary Examiner* — Gregory J Strimbu
(74) *Attorney, Agent, or Firm* — Global IP Counselors, LLP

(57) ABSTRACT

A rear door assembly for a vehicle includes a motor having a shaft with a gear attached thereto. A first end of a lever is rigidly fixed to the shaft for rotation therewith proximate the gear. A belt is engaged with the gear. A rear door is pivotally attached to the vehicle and is movable between a door closed orientation and a door open orientation. The rear door has a gear assembly coupled to the lever. The rear door and the gear assembly are moved by the lever upon rotation of the lever by the motor. The gear assembly receives rotary motion from the belt such that an angular displacement of the rear door caused by the rotary motion of the belt during movement of the rear door between the closed orientation and the open orientation occurs at half the rate of the angular displacement of the lever.

17 Claims, 7 Drawing Sheets

(56) References Cited

U.S. PATENT DOCUMENTS

| | | | |
|---|---|---|---|
| 2006/0169425 A1* | 8/2006 | Long | E05F 15/627 160/213 |
| 2008/0185867 A1* | 8/2008 | Tobergte | B60J 1/1823 296/107.07 |
| 2013/0042531 A1* | 2/2013 | Hird, Jr. | E05F 15/627 219/121.72 |
| 2017/0130506 A1* | 5/2017 | Kennedy | E21F 1/12 |
| 2018/0283072 A1* | 10/2018 | Laurent | E05D 15/408 |
| 2021/0189784 A1* | 6/2021 | Dal Canale | E05F 15/53 |

FOREIGN PATENT DOCUMENTS

| | | | |
|---|---|---|---|
| CN | 111206844 | * | 5/2020 |
| KR | 10-0512188 B1 | | 9/2005 |
| KR | 10-1068172 B1 | | 9/2011 |
| WO | 2005/080108 A1 | | 9/2005 |
| WO | 2015/097321 A1 | | 7/2015 |

* cited by examiner ically can only
pivot up to a point only slightly higher that the top of the rear
opening of the vehicle. With the rear door in the open
orientation, the rear door can create difficulties in instances
where irregularly shaped objects are desired to be placed
within the rear of the vehicle. Further, with the door in the
open orientation, the rear door can also create difficulties for
tall persons loading objects into the rear of the vehicle.

REAR DOOR ASSEMBLY

BACKGROUND

Technical Field

The present disclosure generally relates to a rear door assembly. More specifically, the present disclosure relates to rear door assembly with a rear door that undergoes pivoting movement and angular articulation during the pivoting movement in response to gearing of at least one member that supports the rear door.

BACKGROUND INFORMATION

Sports utility vehicles, vans and other automotive structures can include a rear door that pivots upward to expose a rear opening of the vehicle. Due to design constraints and dimensional constraints, such rear doors typically can only pivot up to a point only slightly higher that the top of the rear opening of the vehicle. With the rear door in the open orientation, the rear door can create difficulties in instances where irregularly shaped objects are desired to be placed within the rear of the vehicle. Further, with the door in the open orientation, the rear door can also create difficulties for tall persons loading objects into the rear of the vehicle.

SUMMARY

One object of the present disclosure is to provide a vehicle that includes a rear opening with a rear door that pivots upward and simultaneously undergoes angular articulation as the rear door moves from a closed orientation to an open orientation.

In view of the state of the known technology, one aspect of the present disclosure is to provide a rear door assembly with a vehicle body structure, a motor, a lever, a belt, a rear door and a gear assembly. The vehicle body structure has a rear portion that defines a rear opening. The motor has a first rotatable shaft extending therefrom with a first gear fixed to the shaft for rotation therewith. The motor is supported to the vehicle body structure adjacent to the rear opening. The lever has a first end that is rigidly fixed to the first shaft for rotation therewith proximate the first gear. The belt is engaged with the first gear. The rear door is pivotally supported to the vehicle body structure adjacent to the rear opening. The rear door is movable between a door closed orientation covering the rear opening and a door open orientation exposing the rear opening. The gear assembly is coupled to the lever. The rear door and the gear assembly are moved by the lever upon rotation of the lever by the motor. The gear assembly receives rotary motion from the belt such that angular displacement of the rear door caused by the rotary motion of the belt during movement between the closed orientation and the open orientation occurs at half the rate of the angular displacement of the lever.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
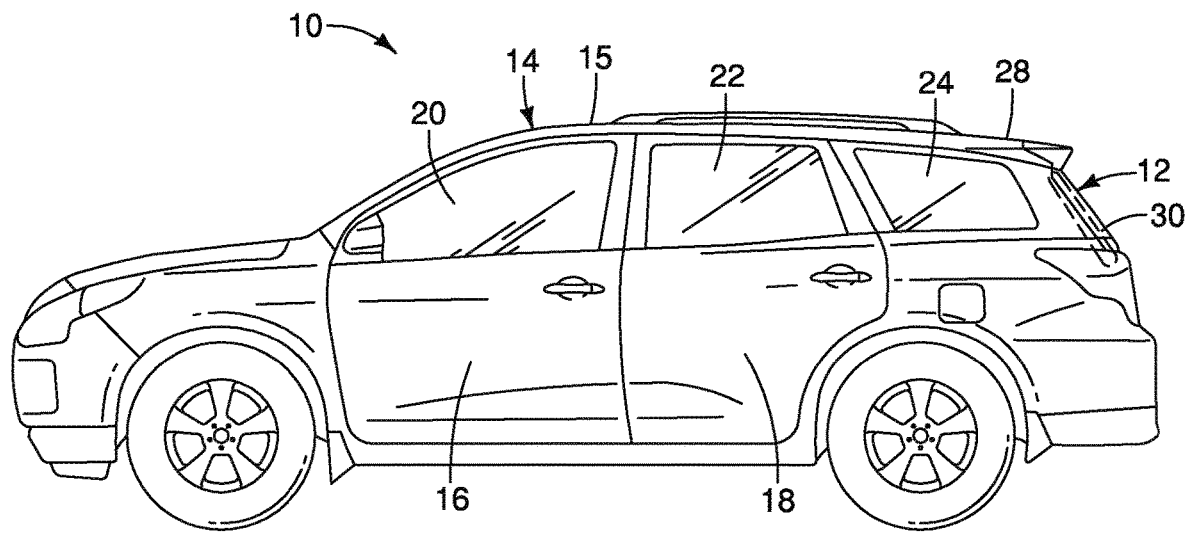
FIG. 1 is a side view of a vehicle that has a rear opening with a rear door, the rear door being in a closed orientation covering the rear opening in accordance with a first embodiment.
Figure 2:
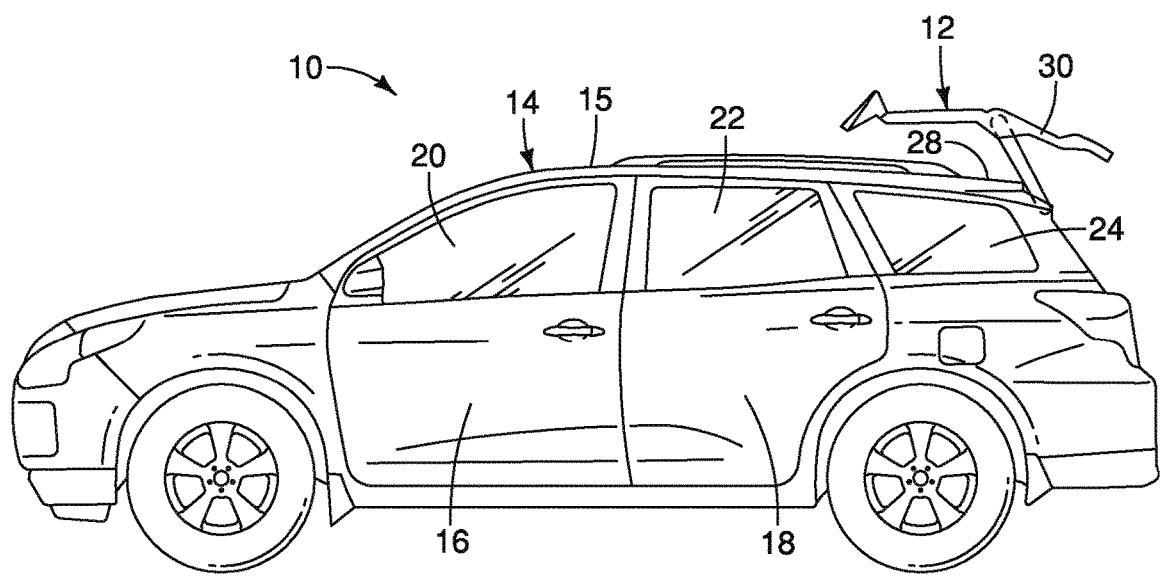
FIG. 2 is another side view of the vehicle similar to FIG. 1 showing the rear door in a fully open orientation with the rear door being at least partially located above a rearward area of the roof structure of the vehicle in accordance with the first embodiment.

Referring initially to FIGS. 1 and 2, a vehicle 10 with a rear door assembly 12 is illustrated in accordance with a first embodiment.

The vehicle 10 includes a vehicle body structure 14 that includes, among other features and components, a roof structure 15, side doors 16 and 18, side windows 20, 22 and 24, and a rear opening 26 at a rearward area 28 of the vehicle body structure 14 of the vehicle 10.

Figure 3:
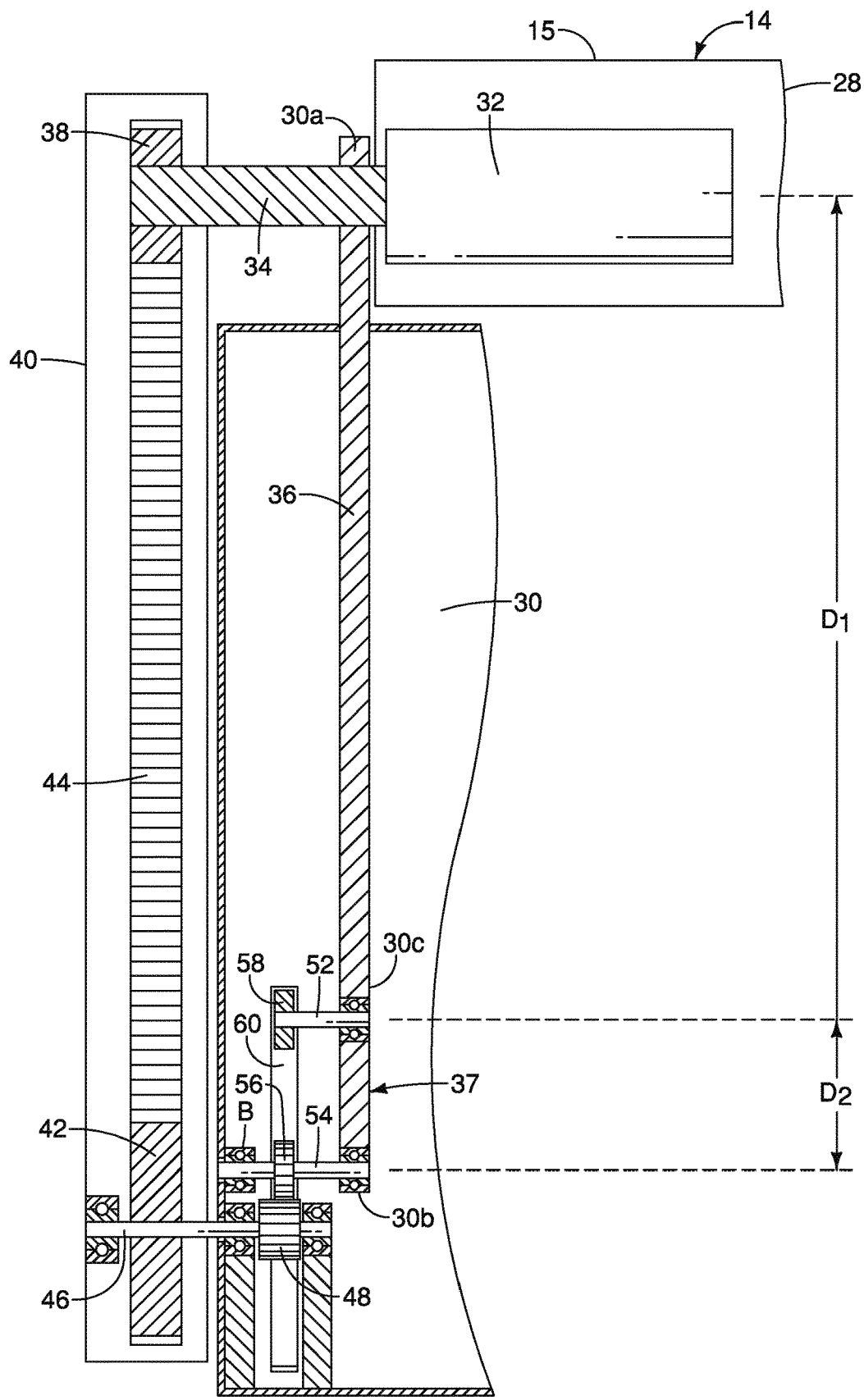
FIG. 3 is a cross-sectional schematic rear view of a motor having a first gear and a lever both fixed to a shaft of the motor for rotation therewith and a rear door with a gear assembly, the gear assembly including a plurality of gears and shaft configured such that rotary motion of the lever and rotary motion from a belt engaged with the first gear cause angular displacement of the rear door during movement between the closed orientation and the open orientation occurs at less the rate of the angular displacement of the lever in accordance with the first embodiment.

The rear door assembly 12 includes a rear door 30 that is movable between a closed orientation shown in FIG. 1 and an open orientation shown in FIG. 2. The rear door 30 is moved between the closed orientation and the open orientation via an electric motor 32 that includes a first shaft 34 pivoted or rotated by operation of the electric motor 32, as shown in FIG. 3. The first shaft 34 has a lever arm 36 fixedly attached thereto such that the lever arm 36 rotates with the first shaft 34 when the motor 32 is operated.

The rear door 30 includes a gear assembly 37 connected to the lever arm 36 and a housing 40, as is described in greater detail below. The rear door 30 and the gear assembly 37 are moved by the lever arm 36 upon rotation of the lever arm 36 by the electric motor 32 (hereinafter, the motor 32). The gear assembly 37 also receives rotary motion from an endless belt 44 (also referred to as a geared belt 44) located within the housing 40, such that angular displacement of the rear door 30 caused by the rotary motion of the belt 44, and the lever arm 36 (hereinafter referred to as the lever 36) during movement between the closed orientation and the open orientation occurs at less than the rate of the angular displacement of the lever 36 and less than the rate of angular displacement of the housing 40. For example, the rate of angular displacement of the rear door 30 can be anywhere between 25% and 75% of the rate of angular displacement of the lever 36 as the rear door 30 is moved between the closed orientation and the open orientation. In the depicted embodiments, and in particular. FIGS. 6-10, the rate of angular displacement of the rear door 30 is approximately half of the rate of angular displacement of the lever 36 as the rear door 30 is moved between the closed orientation and the open orientation.

As shown in FIG. 3, the first shaft 34 also includes a first gear 38 fixedly attached to an outboard end of the first shaft 34. The first gear 38 rotates with the first shaft 34 when the motor 32 is operated.

The first gear 38 is covered (concealed) and shielded by the housing 40. The housing is also supported on the first shaft 34 and encloses a second gear 42. A chain or geared belt 44 (an endless belt) extends between and wraps around the first gear 38 and the second gear 42. The second gear 42 is fixedly attached to a second shaft 46 that extends into the rear door 30 and is rotatably supported by bearings within the rear door 30. A third gear 48 is fixed to the second shaft 46 such that the second gear 42 and the third gear 48 rotated together as one.

Figure 4:
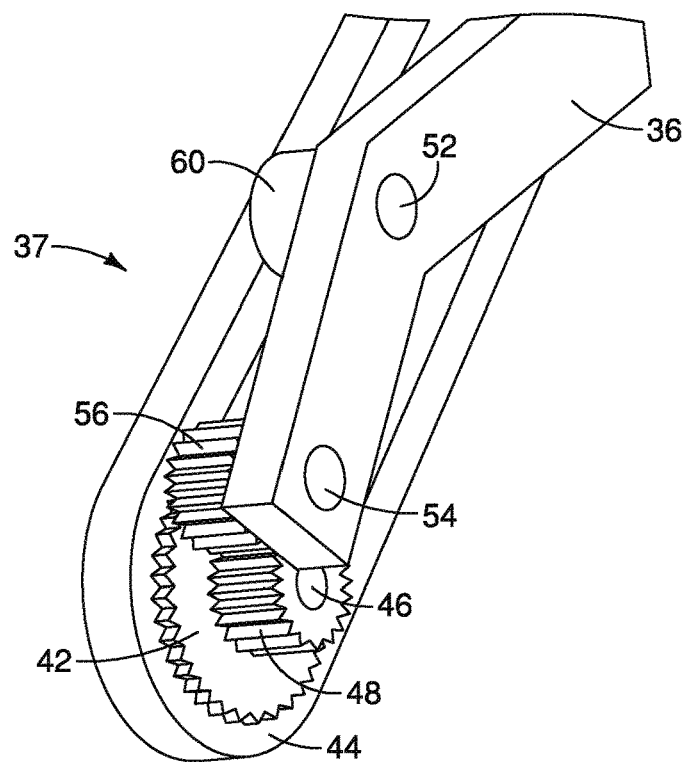
FIG. 4 is a schematic perspective view of portions of the gear assembly with the rear door and a housing removed to show the gearing relationship between the belt and lever of the gear assembly in accordance with the first embodiment.
Figure 5:
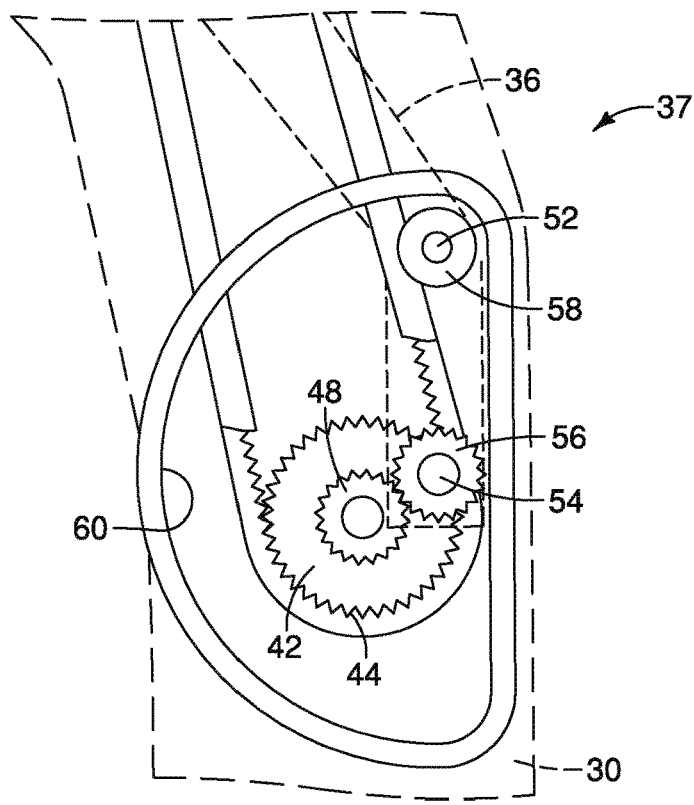
FIG. 5 is a schematic side view of portions of the gear assembly with the rear door and a housing and with the lever shown in phantom showing the gearing relationship between the belt and lever of the gear assembly in accordance with the first embodiment.

The lever arm 36 has a third shaft 52 and a fourth shaft 54 rotatably supported thereto. The fourth shaft 54 (also referred to as the driven shaft 54) is installed to a distal end of the lever arm 36. The third shaft 52 is rotatably installed to the lever arm 36 at a location near but spaced apart from the fourth shaft 54, as shown in FIGS. 3-5. The fourth shaft 54 moves with the end of the lever 36 but rotates freely with respect thereto. The fourth shaft 54 is further supported to the rear door 30 by a bearing such that the fourth shaft 54 moves with the rear door 30, or, as is described below, movement of the lever 36 transmits that movement through the fourth shaft 54 to the rear door 30.

As shown in FIGS. 3, 4 and 5, the fourth gear 56 is in direct contact with the third gear 48 such that when the motor 32 rotates or pivots the first shaft 34, the belt 44 causes corresponding rotation of the second gear 42. Rotation of the second gear 42 causes rotation of the second shaft 46 and corresponding rotation of the third gear 48. Rotation of the third gear 48 causes rotation of the fourth gear 56 in a direction the opposite the rotation of the third gear 48.

The respective outer diameters and number of gear teeth of the third gear 48 and the fourth gear 56 are designed such that the angular rotation of the third gear 48 is greater than the rotation of the fourth gear 56. In a preferred embodiment, when the third gear 48 rotates 180 degrees the fourth gear 56 rotates 90 degrees in the opposite direction of the rotation of the third gear 48.

The rotation of the fourth gear 56 causes the fourth shaft 54 to pivot the rear door relative to the lever 36 since the fourth shaft 54 is supported to the rear door 30. As should be observed in the schematic depiction in FIG. 3, the lever 36 is not directly attached to the rear door 30. Rather, the only mechanical connection between the lever 36 and the rear door 30 is the connection of the fourth shaft 54 to the distal end of the lever 36 and to the bearing B fixed to the rear door 30.

As is described further below with reference to FIGS. 6-11, the fourth gear 56 orbits about the third gear 48 when the rear door 30 is moved. The orbital movement of the fourth gear 56 causes relative movement of the roller 58 about an arcuate path that coincides with a roller track 60 that is fixed within the rear door 30. The roller track 60 is provided to support the roller 58 during orbital movement of the fourth gear 56 about the third gear 48. As is shown in FIGS. 6-11, as the fourth gear 56 orbits about the third gear 48, the angular orientation of the rear door 30 is altered relative to the lever 36 and the track 60.

Figure 6:
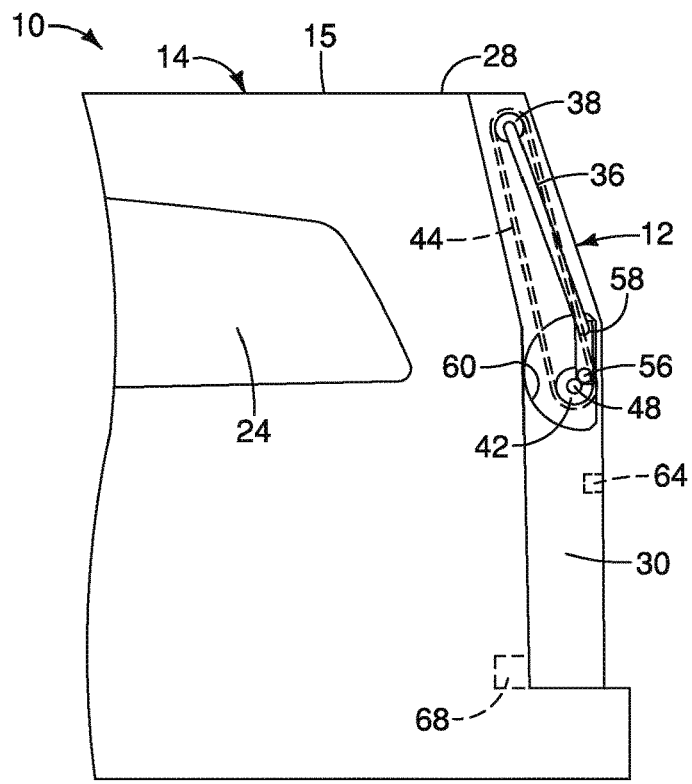
FIG. 6 is a first side schematic view of the rear of the vehicle showing the rear door and elements of the gear assembly with the rear door in the closed orientation in accordance with the first embodiment.

As shown in FIG. 6 with the rear door 30 in the closed orientation, the fourth gear 56 is located rearward and slightly above the third gear 48 (the fourth gear 56 being at about 1:30 or 2:00 O'clock relative to the third gear 48 in FIG. 6).

Figure 7:
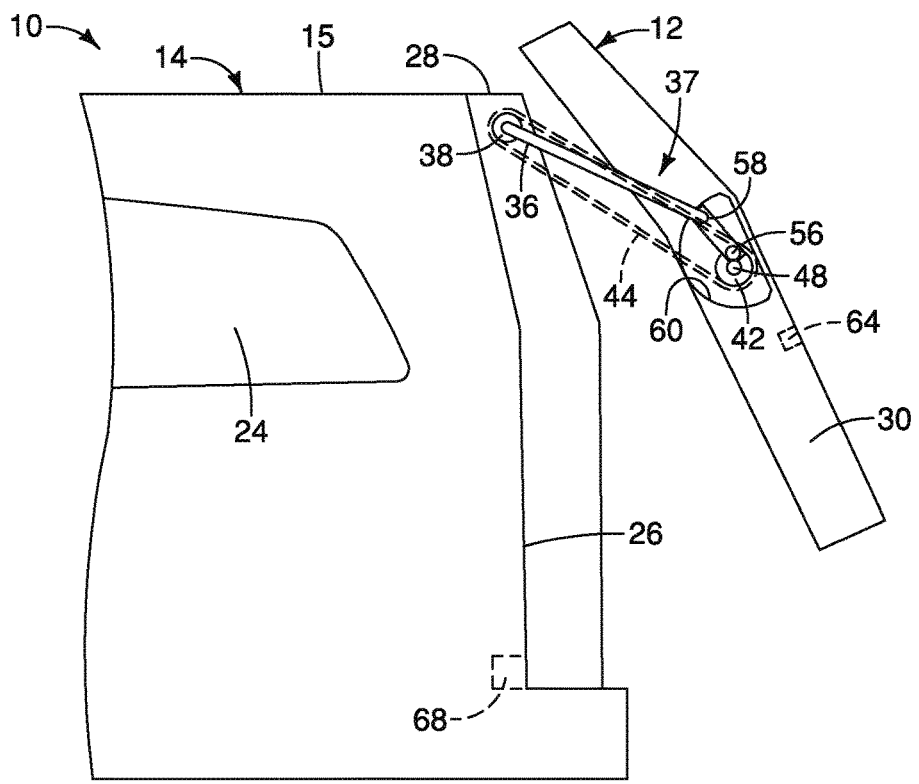
FIG. 7 is a second side schematic view of the rear of the vehicle showing the rear door and elements of the gear assembly with the rear door in a first intermediate orientation in accordance with the first embodiment.

When a switch 64 is activated, a latch mechanism 68 releases the rear door 30 and the motor 32 is operated to open the rear door 30. Initially, as shown in FIG. 7, the rear door 30 is moved by the rotation of the lever 36 to a first intermediate orientation. During the movement between the closed orientation to the first intermediate orientation in FIG. 7, the third gear 48 rotates the fourth gear 56 such that the fourth gear 56 orbits in a counterclockwise direction relative to FIG. 7.

Hence, in FIG. 7 the fourth gear 56 is now located almost directly above the third gear 48 (the fourth gear 56 being at about noon relative to the third gear 48). This orbiting movement of the fourth gear 56 to the position shown in FIG. 7 causes a corresponding change in the angular orientation of the rear door 30 since the fourth shaft 54 supporting the fourth gear 56 is direction supported to the rear door 30. Specifically, the gear 36 has moved approximately 40 degrees in a counterclockwise direction from the orientation shown in FIG. 6 as compared to the orientation shown in FIG. 7. Conversely, the rear door 30 has undergone an angular displacement relative to the lever 36 of about 20 degrees.

Figure 8:
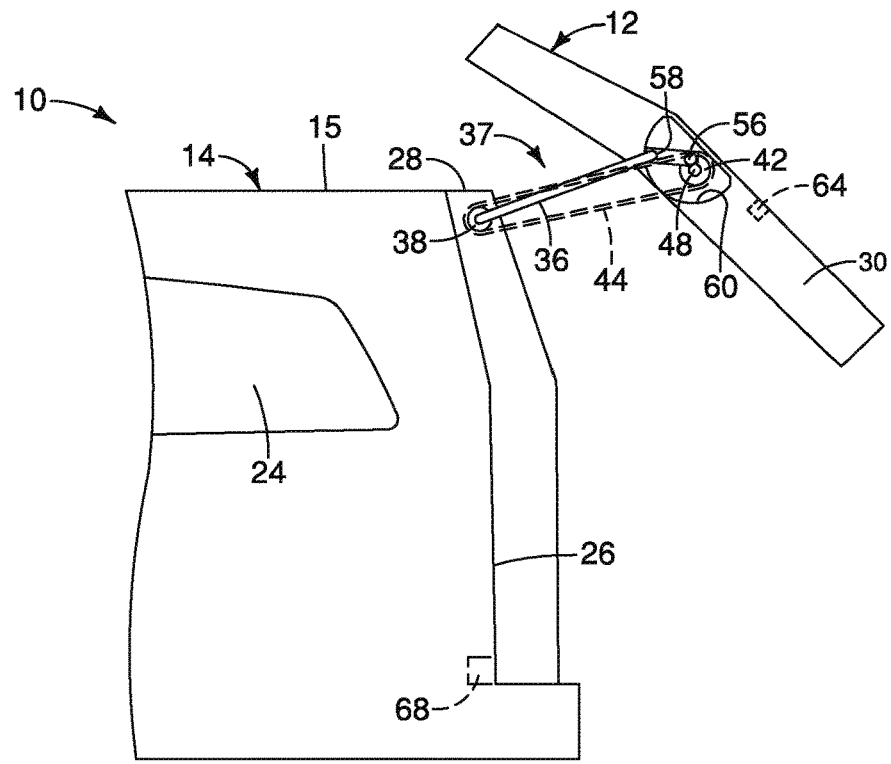
FIG. 8 is a third side schematic view of the rear of the vehicle showing the rear door and elements of the gear assembly with the rear door in a second intermediate orientation in accordance with the first embodiment.

As the rear door 30 continues to open, in FIG. 8 the rear door 30 has moved to a second intermediate orientation. A comparison of FIGS. 7 and 8 shows that the fourth gear 56 has orbited further about the third gear 48. This orbiting movement of the fourth gear 56 to the position shown in FIG. 8 causes a further corresponding change in the angular orientation of the rear door 30. Specifically, the gear 36 has approximately another 40 degrees in a counterclockwise direction from the orientation shown in FIG. 7 as compared to the orientation shown in FIG. 8. Conversely, the rear door 30 has undergone an angular displacement relative to the lever 36 of about 20 degrees.

Figure 9:
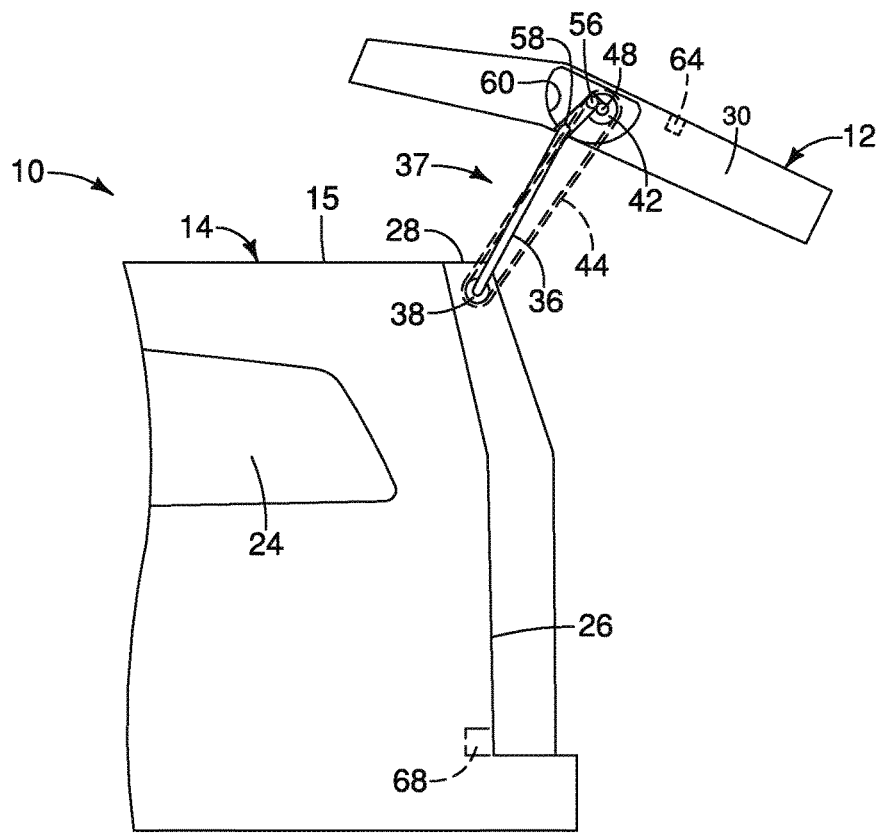
FIG. 9 is a fourth side schematic view of the rear of the vehicle showing the rear door and elements of the gear assembly with the rear door in a third intermediate orientation in accordance with the first embodiment.

As the rear door 30 undergoes continued opening, in FIG. 9 the rear door 30 has moved to a third intermediate orientation. A comparison of FIGS. 8 and 9 shows that the fourth gear 56 has orbited further about the third gear 48. This orbiting movement of the fourth gear 56 to the position show in FIG. 9 causes a further corresponding change in the angular orientation of the rear door 30. Specifically, the gear 36 has approximately another 45 degrees in a counterclockwise direction from the orientation shown in FIG. 8 as compared to the orientation shown in FIG. 9. Conversely, the rear door 30 has undergone an angular displacement relative to the lever 36 of about 22.5 degrees.

Figure 10:
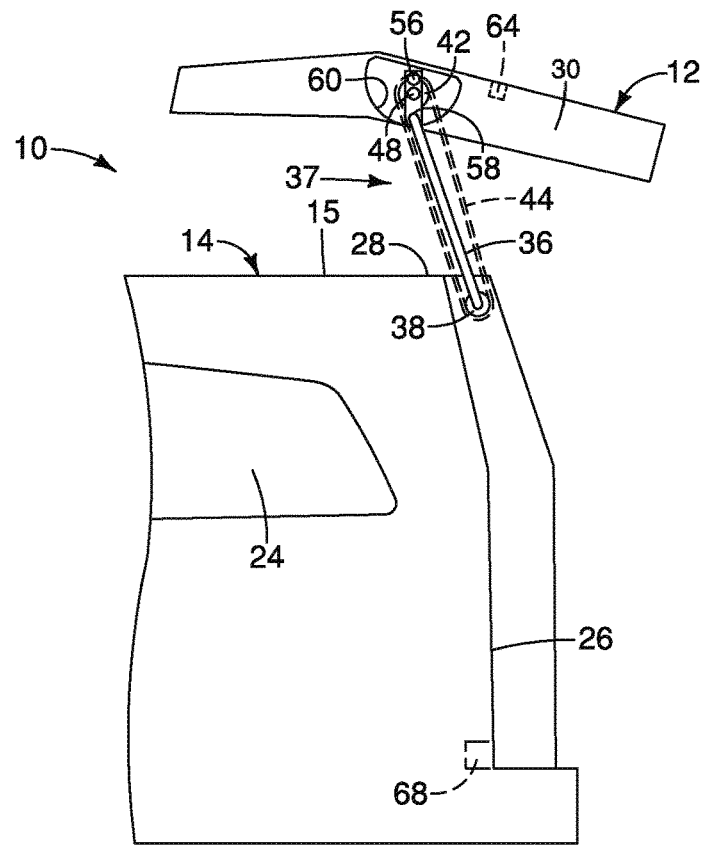
FIG. 10 is a fifth side schematic view of the rear of the vehicle showing the rear door and elements of the gear assembly with the rear door in a fourth intermediate orientation in accordance with the first embodiment.

Continued movement of the rear door 30 as it opens as shown in FIG. 10, shows that the rear door 30 has moved to a fourth intermediate orientation. A comparison of FIGS. 9 and 10 shows that the fourth gear 56 has orbited further about the third gear 48. This orbiting movement of the fourth gear 56 to the position show in FIG. 10 causes a further corresponding change in the angular orientation of the rear door 30. Specifically, the gear 36 has approximately another 45 degrees in a counterclockwise direction from the orientation shown in FIG. 9 as compared to the orientation shown in FIG. 10. However, the rear door 30 has undergone a further angular displacement relative to the lever 36 of about 22.5 degrees. Hence, as shown in FIG. 10, the lever 36 has been rotated approximately 180 degrees from the closed orientation shown in FIG. 6, while the rear door 30 has undergone an angular displacement of approximately 90 degrees relative to the lever arm 36, as compared to FIG. 6.

Figure 11:
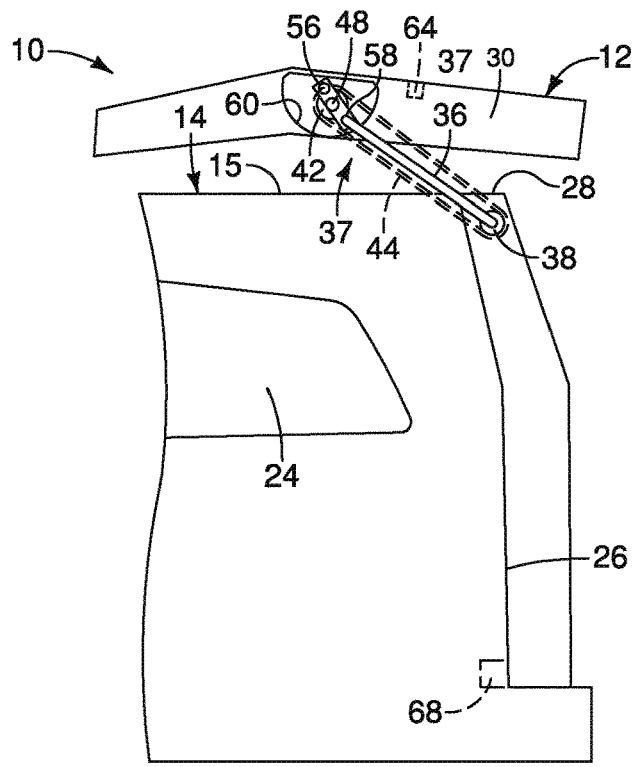
FIG. 11 is a fifth side schematic view of the rear of the vehicle showing the rear door and elements of the gear assembly with the rear door in a fully open orientation in accordance with the first embodiment.

Finally, the rear door 30 moves to a fully open orientation in FIG. 11. A comparison of FIGS. 10 and 11 shows that the fourth gear 56 has orbited further about the third gear 48. This orbiting movement of the fourth gear 56 to the position show in FIG. 11 has caused a further corresponding change in the angular orientation of the rear door 30. Specifically, the gear 36 has approximately another 45 degrees in a counterclockwise direction from the orientation shown in FIG. 10 as compared to the orientation shown in FIG. 11. However, the rear door 30 has undergone a further angular displacement relative to the lever 36 of about 22.5 degrees.

The movement of the rear door 30 relative to the lever 36 is such that most, if not all, of the rear door 30 is now located above the roof structure 15. Thus, as shown in FIG. 11, the rear opening 26 is fully accessible with little or no interference from the rear door 36 with respect to access of a cargo area within the rear of the vehicle 10.

Hence, the gear assembly 37 is configured such that movement of the rear door 30 between the door closed orientation (FIG. 6) and the door open orientation (FIG. 11) defines an arcuate path shown sequentially in FIGS. 6-11 for the rear door 30 that extends rearward of the rear area 28 of the vehicle body structure 14 to an area above the rearward area 28 of the vehicle body structure 14 and above the roof structure 5. Therefore, the gear assembly 37 is configured such that during movement of the rear door 30 from the door closed orientation (FIG. 6) to the door open orientation (FIG. 11) the rear door 30 moves from an upright orientation (FIG. 6) to a horizontal orientation (FIG. 11).

The change in angular orientation of the rear door 30 is possible due to the configuration of the lever 36 and the gearing of the gear assembly 37. Specifically, the lever 30 a first end 30a attached to the first shaft 34 of the motor 32, a second end 30b and an intermediate area 30c spaced apart from the first end 30a by a first distance $D_1$ and spaced apart from the second end 30b by a second distance $D_2$, as shown in FIG. 3. The first distance $D_1$ is more than twice the length of the second distance $D_2$. The roller 58 is attached for rotatable movement about the third shaft 52 (which defines an axis of rotation) at the intermediate area 30c of the lever 30. The roller track 60 (an arcuate track 60) is fixed to the rear door 30 such that a center point of the arcuate track 60 coincides with the third shaft 52 (the axis of rotation) such that the roller 58 contacts the roller track 60 (the arcuate track 60) during movement of the roller 58 caused by orbiting movement of the fourth gear 56 about the third gear 48.

The vehicle body structure 14 (not including the elements of the rear door assembly 12 and the gear assembly 37) are conventional components that are well known in the art. Since these structures are well known in the art, these structures will not be discussed or illustrated in detail herein. Rather, it will be apparent to those skilled in the art from this disclosure that the components can be any type of structure and/or programming that can be used to carry out the present invention.

Second Embodiment

Figure 12:
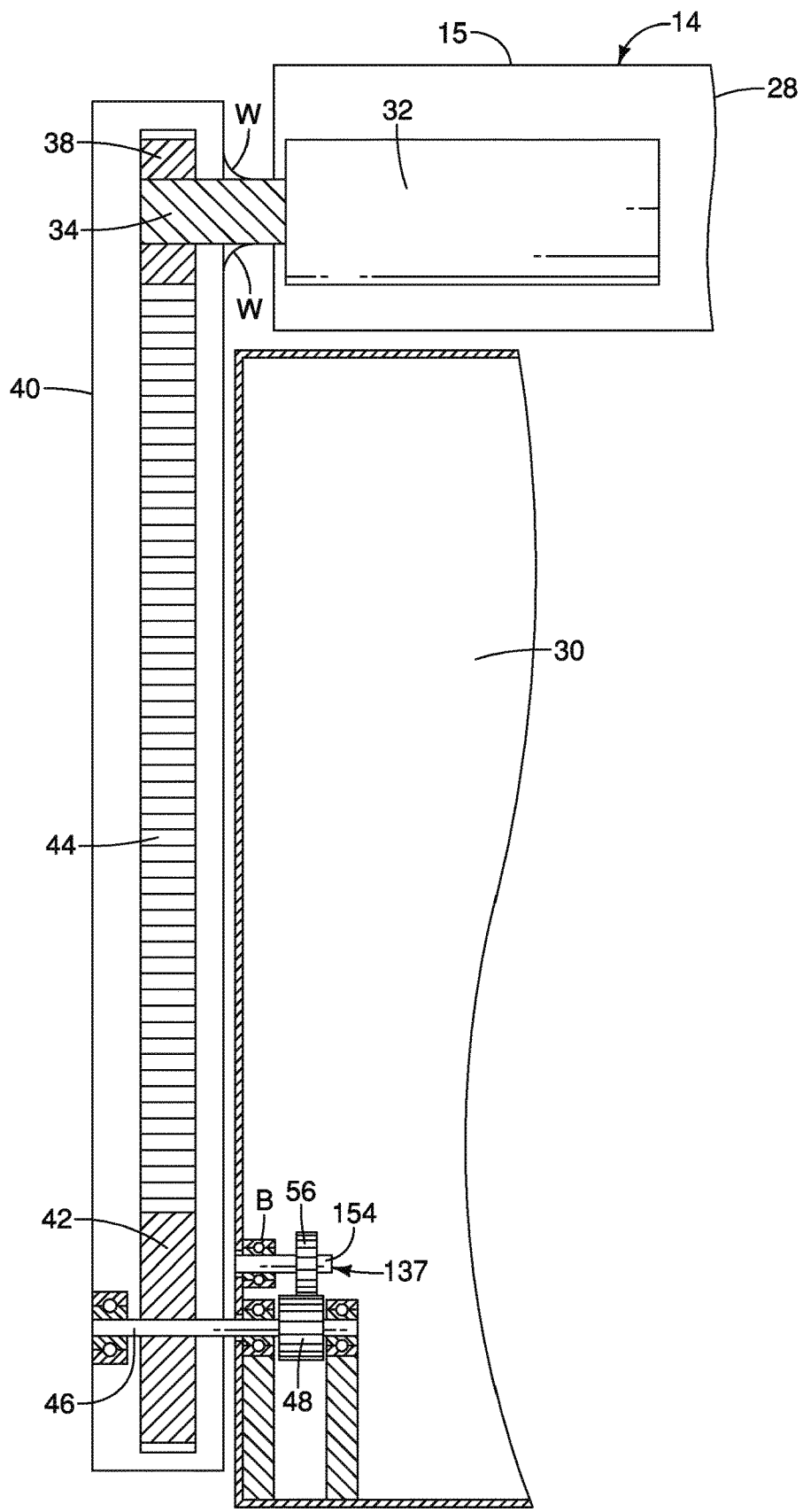
FIG. 12 is a cross-sectional schematic rear view of a motor having a first gear and a lever both fixed to a shaft of the motor for rotation therewith and a rear door with a gear assembly, the gear assembly including a plurality of gears and shaft configured such that rotary motion of the lever and rotary motion from a belt engaged with the first gear cause angular displacement of the rear door during movement between the closed orientation and the open orientation occurs at less the rate of the angular displacement of the lever in accordance with a second embodiment.

Referring now to FIG. 12, a rear door assembly with the rear door 30 and a gear assembly 137 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the gear assembly 137 includes many of the elements of the rear assembly 37 of the first embodiment, but with some modifications. The rear assembly 137 has been modified such that the lever 36 of the first embodiment is completely omitted. Further, the fourth shaft 54 is replaced with a fourth shaft 154 that is shorter than the fourth shaft 54 of the first embodiment since there is no connection to the removed lever 36. As well, the roller 58 and the track 60 can optionally be removed in the second embodiment.

The housing 40 in the second embodiment is the same as in the first embodiment, except that the housing 40 is fixedly attached to the first shaft 34 via, for example, welds W. Alternatively, the housing 40 can be press-fitted to the end of the first shaft 34 of the motor 32 or attached via mechanical fasteners. With the modifications described above, the housing 40 now serves as a lever that transmits the torque (rotary motion or pivoting motion) from the electric motor 32 to the second shaft 46 that in turn moves the rear door 30. The first and second gears 38 and 42 due to their connection by the belt 44, cause the third gear 48 to rotate relative to the fourth gear 46. The third gear 48 rotates relative to the rearward area 28 of the vehicle body structure 14 in a first direction and at a first rate. Correspondingly, the fourth gear 46 rotates in a second direction opposite to the first direction and orbits the third gear 48. The third gear 48 has an outer diameter that is larger than the outer diameter of the fourth gear 56. In the second embodiment, the size of the third gears 48 and the fourth gear 56 are such the fourth gear 56 rotates (and orbits) at a rate that is approximately half that of the third gear 48. Since the fourth gear 46 rotates about the fourth shaft 154 and the fourth shaft 154 is supported to the rear door 30 via the bearing B, the rear door 30 does not pivot upward at the same rate as the housing 40 (the lever of the second embodiment).

Thus, in the second embodiment, the housing 40 (the lever) undergoes twice the angular displacement as the rear door 30. The angular displacement of the rear door 30 relative to the angular displacement of the housing 40 (the lever) is the same as that shown in FIGS. 6-11 and described above with respect to the first embodiment.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the rear door assembly. Accordingly, these terms, as utilized to describe the present invention should be interpreted relative to a vehicle equipped with the rear door assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A rear door assembly, comprising:
   a vehicle body structure having a rear portion that defines a rear opening;
   a motor with a first rotatable shaft extending therefrom having a first gear fixed to the shaft for rotation therewith, the motor being supported by the vehicle body structure adjacent to the rear opening;
   a housing having a first end supported on the first rotatable shaft and a second end, the first gear being located within the first end of the housing, the second end of the housing supporting a second rotatable shaft defining a first shaft portion and a second shaft portion, the first shaft portion being rotatably supported by the second end of the housing, a second gear being fixed to the first shaft portion and disposed within the second end of the housing, the second shaft portion extending out of the housing;
   an endless belt engaged with the first gear and the second gear;
   a rear door pivotally supported on the second shaft portion of the second rotatable shaft adjacent the second end of the housing, a third gear being fixed to the second shaft portion of the second rotatable shaft and disposed within the rear door,
   a driven shaft rotatably supported by the rear door, the driven shaft being spaced apart from the second shaft portion, a fourth gear being fixed to the driven shaft such that in response to rotation of the first rotatable shaft the belt rotates the second gear while moving the second end of the housing and the rear door rearward and upward relative to the vehicle body structure and the rear opening causing the rear door to move from a door closed orientation covering the rear opening to a door open orientation exposing the rear opening;
   the second rotatable shaft, the third gear, the fourth gear and the driven shaft defining a gear assembly that receives rotary motion from the belt and the second gear when the motor rotates the first shaft such that the housing undergoes an angular displacement and the rear door also undergoes an angular displacement between the closed orientation and the open orientation caused by the angular displacement of the housing and operation of the gear assembly, a rate of the angular displacement of the rear door is less than a rate of the angular displacement of the housing.

2. The rear door assembly according to claim 1, wherein the gear assembly is configured such that the angular displacement of the rear door between the door closed orientation and the door open orientation defines an arcuate path that extends rearward of the rear portion of the vehicle body structure to an area above the rear portion of the vehicle body structure.

3. The rear door assembly according to claim 1, wherein the gear assembly is configured such that during the angular displacement of the rear door from the door closed orientation to the door open orientation the rear door moves from an upright orientation in the closed orientation to a horizontal orientation in the open orientation.

4. The rear door assembly according to claim 3, wherein the gear assembly is configured such that the angular displacement of the rear door between the door closed orientation and the door open orientation defines an arcuate path that extends rearward of the rear portion of the vehicle body structure to an area above the rear portion of the vehicle body structure.

5. The rear door assembly according to claim 1, wherein the second gear has an outer diameter that is greater than an outer diameter of the third gear.

6. The rear door assembly according to claim 1, wherein the rate of the angular displacement of the rear door occurs at between 25% and 75% of the rate of the angular displacement of the housing.

7. The rear door assembly according to claim 6, wherein the rate of the angular displacement of the rear door occurs at approximately half of the rate of the angular displacement of the housing.

8. The rear door assembly according to claim 1, further comprising
a lever having a first end and a second end, the first end of the lever being rigidly fixed to the first rotatable shaft for rotary movement therewith, the driven shaft being supported by the lever proximate the second end of the lever.

9. The rear door assembly according to claim 8, wherein the second end of the lever rotatably supports a third rotatable shaft the fourth gear being engaged with the third gear such that rotation of the third gear causes orbiting movement of the fourth gear about the third gear and corresponding movement of the rear door about the first rotatable shaft.

10. The rear door assembly according to claim 9, wherein the lever includes an intermediate area spaced apart from the first end of the lever by a first distance and spaced apart from the second end of the lever by a second distance, the first distance being more than twice the second distance, a roller attached to the third rotatable shaft that is supported by the lever for rotatable movement about an axis of rotation at the intermediate area of the lever, and
an arcuate track fixed to the rear door such that the roller contacts the arcuate track.

11. The rear door assembly according to claim 8, wherein the lever is fixed to the first rotatable shaft of the motor for rotation therewith.

12. The rear door assembly according to claim 8, wherein the rate of the angular displacement of the rear door occurs at between 25% and 75% of the rate of the angular displacement of the lever.

13. The rear door assembly according to claim 12, wherein
the rate of the angular displacement of the rear door occurs at approximately half of the rate of the angular displacement of the lever.

14. A rear door assembly, comprising:
a vehicle body structure having a rear portion that defines a rear opening;
a motor with a first rotatable shaft extending therefrom having a first gear fixed to the shaft for rotation therewith, the motor being attached to the vehicle body structure adjacent to and above the rear opening;
a lever having a first end and a second end, the first end being rigidly fixed to the first shaft proximate the first gear for rotation with the first shaft, the second end of the lever supporting a driven shaft;
a housing having a first end supported on the first rotatable shaft and a second end, the first gear being located within the first end of the housing, the second end of the housing supporting a second rotatable shaft defining a first shaft portion and a second shaft portion, the first shaft portion being rotatably supported by the second end of the housing, a second gear being fixed to the first shaft portion and disposed within the second end of the housing, the second shaft portion extending out of the housing;
an endless belt engaged with the first gear and the second gear;
a rear door supporting the second shaft portion of the second rotatable shaft adjacent the second end of the housing, a third gear being fixed to the second shaft portion of the second rotatable shaft and disposed within the rear door;
a driven shaft rotatably supported within the rear door and spaced apart from the second shaft portion, a fourth gear being fixed to the driven shaft such that in response to rotation of the first rotatable shaft the belt rotates the second gear while moving the second end of the housing and the rear door rearward and upward relative to the vehicle body structure and the rear opening causing the rear door to move from a door closed orientation covering the rear opening to a door open orientation exposing the rear opening;
the second rotatable shaft, the third gear, the fourth gear and the driven shaft defining a gear assembly that receives rotary motion from the second gear and the lever when the motor rotates the first shaft and the lever such that an angular displacement of the rear door caused by the rotary motion of the second gear and the lever occurs at a rate that is less than a rate of an angular displacement of the housing.

15. The rear door assembly according to claim 14, wherein
the second gear has an outer diameter that is greater than an outer diameter of the third gear.

16. The rear door assembly according to claim 15, wherein
the rate of the angular displacement of the rear door occurs at between 25% and 75% of the rate of the angular displacement of the lever.

17. The rear door assembly according to claim 15, wherein
the lever includes an intermediate area spaced apart from the first end of the lever by a first distance and spaced apart from the second end of the lever by a second distance, the first distance being more than twice the second distance, a third shaft is supported by the lever at the intermediate area with a roller attached to the third shaft for rotatable movement about an axis of rotation at the intermediate area of the lever, and an arcuate track fixed to the rear door such that the roller contacts the arcuate track during movement of the roller relative to the arcuate track.

* * * * *